UNITED STATES PATENT OFFICE.

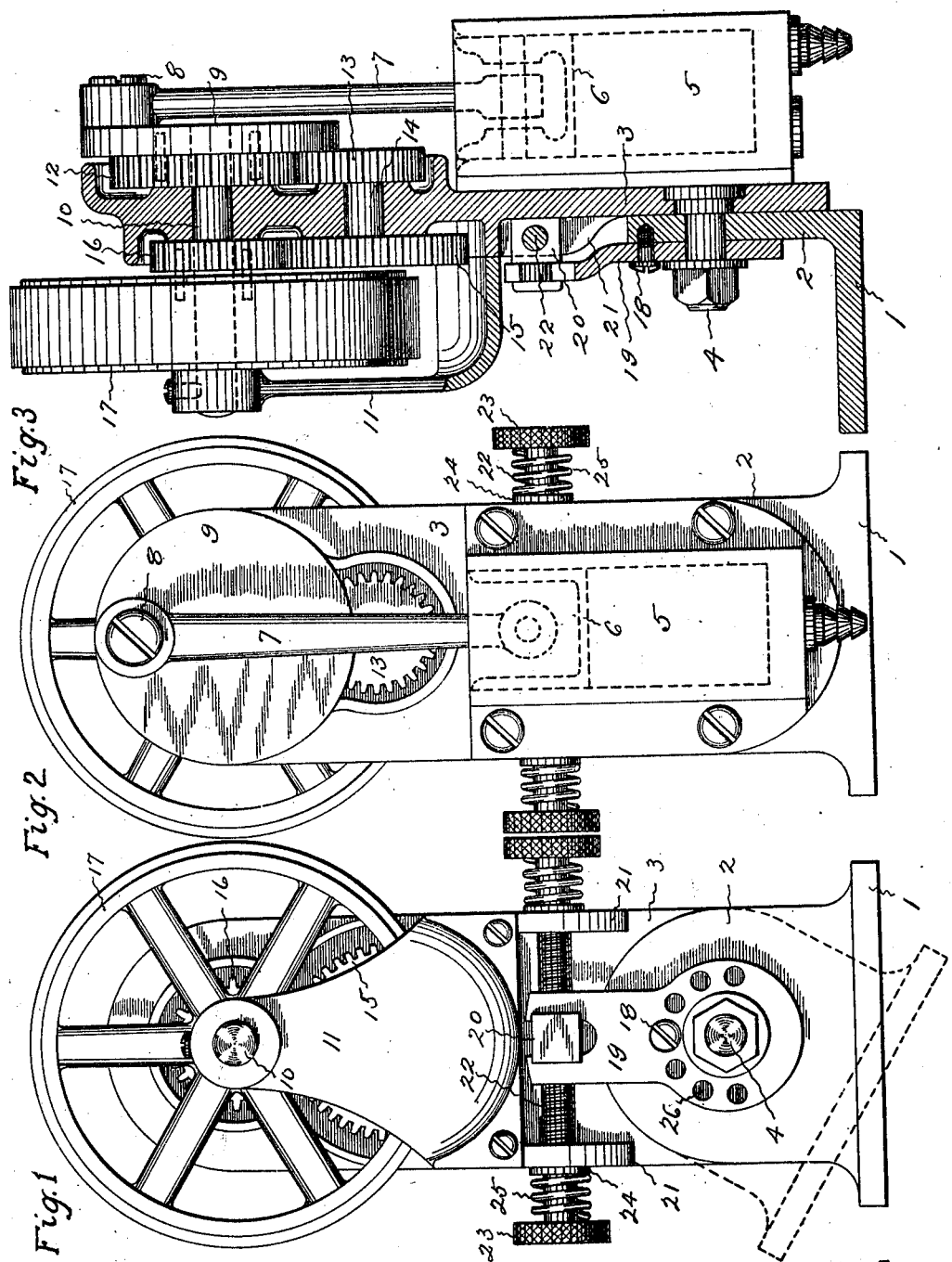

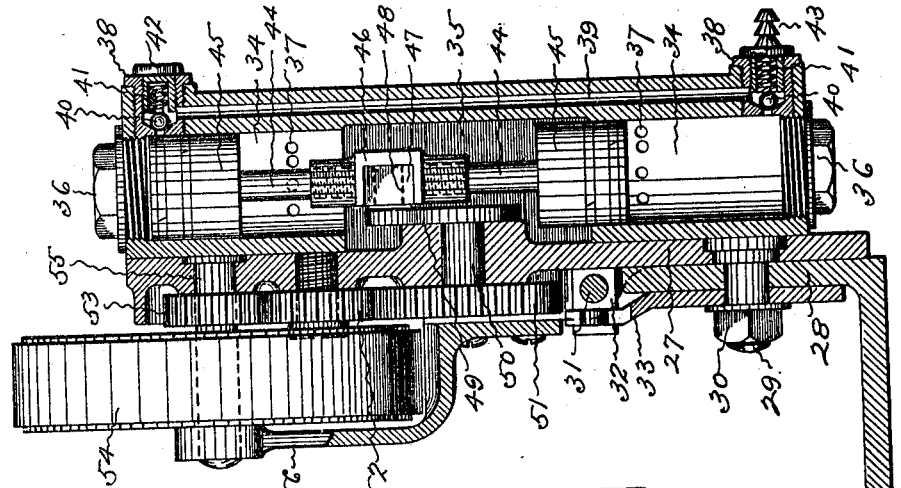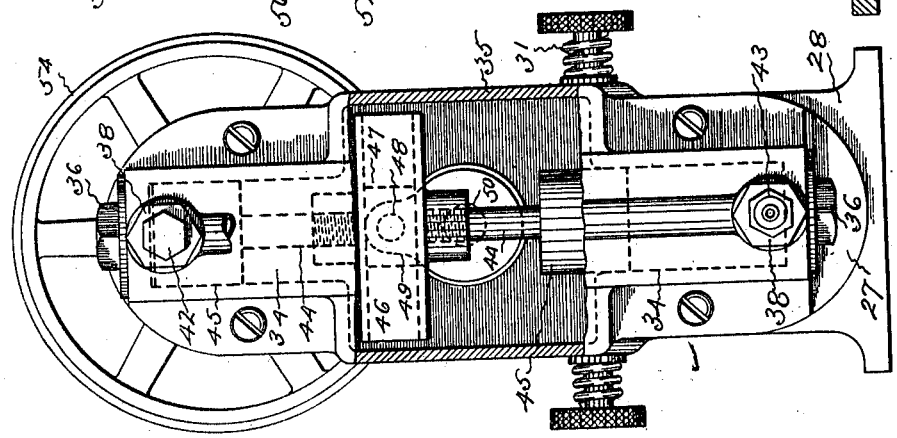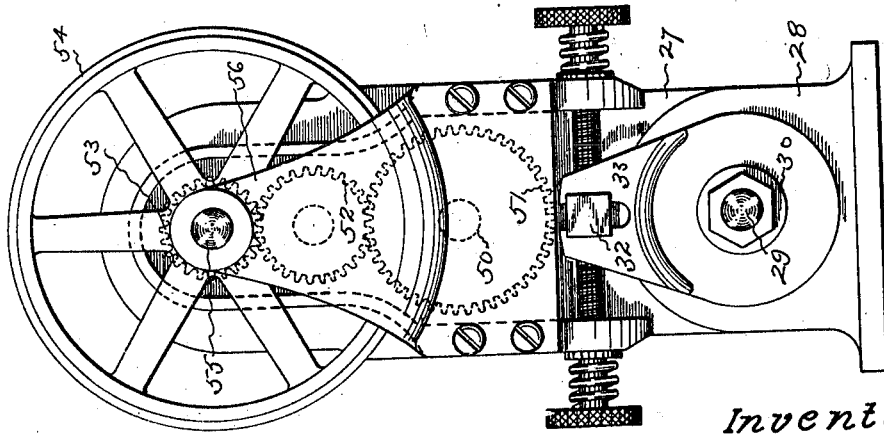

JOHN J. McINTYRE, OF HARTFORD, CONNECTICUT.

AIR-PUMP.

974,582.  Specification of Letters Patent.  Patented Nov. 1, 1910.

Application filed May 7, 1910. Serial No. 559,918.

*To all whom it may concern:*

Be it known that I, JOHN J. MCINTYRE, a citizen of the United States, residing at Hartford, in the county of Hartford and State of Connecticut, have invented a new and useful Improvement in Air-Pumps, of which the following is a specification.

This invention relates to an air pump which is particularly designed to be attached to the frame of an automobile for inflating tires, blowing whistles or horns, or for any other purpose.

The object of this invention is to provide a very simple, light, small, and durable reciprocating pump, either single or double acting, which can be attached to practically any existing automobile frame in such position that, when it is desired to use it, the pump frame may be easily and quickly swung and held by suitable adjusting means, so that the driving pulley will bear against the fly wheel of the engine with the necessary frictional contact to operate the pump at the required speed, and when it is not in use, the pump frame may be swung so that the pulley is carried away from the fly wheel.

In most automobiles the available space for attaching an independent pumping device is very limited, and in many cars the location of the motor and other mechanism is such that the only part of the frame available for mounting the pump is not in proper position to permit the use of the types of direct driven pump heretofore conceived.

My invention produces a pump in which the driving wheel and the pump mechanism are capable of a very wide range of adjustments with relation to the supporting base so that the latter can be mounted in such a variety of different positions as to permit its use with most if not all of the existing types of car. This is effected by providing two means of adjustment of the pump with relation to the base, the first, or what may be termed the coarse adjustment, being adapted for initial use in permanently mounting the structure with its driving wheel near the fly wheel of the motor, and the second, or fine adjustment, being adapted to move the wheel into and out of contact with the fly wheel. To realize the full benefits of the invention, the fine adjusting means should be capable of operation independently of the coarse while the whole structure is self-contained, or in other words, it is not necessary to connect it with the frame of the car other than by its own base or support.

In the accompanying drawings, which illustrate preferred forms of both a single and a double acting pump that embody the invention; Figure 1 shows a front elevation of the single acting pump. Fig. 2 shows a rear elevation of the same. Fig. 3 shows a side elevation with the pump frame and supporting base cut in central section. Fig. 4 shows a front elevation of the double acting pump. Fig. 5 shows a rear elevation with a portion of the cylinder shell broken away to expose the interior. Fig. 6 shows a central vertical section of the double acting embodiment of the invention.

The supporting base is shown as formed in the shape of an angle bracket with a foot 1, that is adapted to be rigidly secured to the frame of an automobile as near to the engine fly wheel as is permitted by the location of the automobile parts, and the standard 2, to which the pump frame 3 is pivotally attached by the stud bolt 4.

In the form of pump first illustrated, the single cylinder 5 is attached to the back of the pump frame, and movable in the cylinder is a piston 6 that is connected by a pitman 7 with a crank stud 8 that projects from the crank disk 9. The crank disk turns loosely on the arbor 10 that is supported by the pump frame and by the arm 11 that is secured to the front of the frame. Attached to the crank disk is a gear 12 which meshes with a pinion 13 fastened to an arbor 14 keyed upon which is a gear 15. Meshing with this latter gear is a pinion 16 that is fastened to the hub of the pulley 17, this pinion and the pulley turning loosely on the arbor 10. By means of this train of gears the speed of rotation of the crank disk is very much reduced from the speed of rotation of the pulley. Secured to the front of the base standard by means of the screw 18 and the stud bolt 4 is a plate 19. Loosely mounted in the forked end of this plate is a nut 20. Passing through this nut and through perforations in ears 21 that are formed on the front of the frame is a threaded spindle 22. This spindle is preferably provided on each end with a knurled head 23. The spindle is shown as held under normal conditions from longitudinal movement with relation to the ears that project from the base and through which the spindle passes, by springs 25 that thrust between the spindle heads and the washers 24.

The pump frame may be set at any desired angle with relation to the base by removing the screw 18, and after turning the base or the frame inserting the screw through one of the perforations 26 and into the base. This permits the base to be attached to any convenient part of the automobile frame, and the pump frame turned so that the pulley will be adjacent to the engine fly wheel. After the pump is located in this manner, if it is desired to use it, the threaded spindle is turned by grasping either of the heads so as to swing the pump frame and bring the pulley into contact with the fly wheel. When the pump is not in use, the spindle is turned and the frame swung so that the pulley is carried away from the fly wheel. With this construction, the pulley may be quickly brought into contact with or removed from contact with the fly wheel, and should from any cause the pressure of the pulley against the fly wheel be too great, the pump frame will give way, the springs yielding to permit this.

In the double acting pump shown, the frame 27 is pivotally connected with the supporting bracket 28 by the stud 29. These parts may be coarsely adjusted with relation to each other by loosening the nut 30, and finely adjusted by means of the spindle 31 that passes through the nut 32 held by the forked end of the plate 33 that is clamped on the front of the bracket by the nut on the stud. The cylinders 34 are formed in a shell 35 that is attached to the back of the frame. The cylinders are shown as having their head ends closed by screw plugs 36. Intake openings 37 are made through the walls of the cylinders to permit the inflow of air. Plugs 38 containing the valve chambers are screwed into the shell near the heads of the cylinders. The valve chambers are connected by a passage 39. In each valve chamber is a ball valve 40 that is held against the discharge port by a spring 41. The outer ends of the valve chambers are closed by screw plugs 42, one of which is solid, and the other of which is provided with a hose coupling 43. By changing these plugs, a hose may be connected with either end of the cylinder shell. The stems 44 of the pistons 45 are connected with a yoke 46 that is movable in the cylinder shell between the open ends of the cylinders. In this yoke is a block 47 that is mounted on the crank pin 48. The crank 49 is fixed to an arbor 50 bearing a gear 51 that meshes with an intermediate gear 52. The intermediate gear meshes with a pinion 53 that is fastened to the driving pulley 54. The pulley and pinion are loose upon the stud 55, the inner end of which is held by the frame, and the outer end of which is supported by the bracket 56 that is fastened to the frame.

The invention claimed is:

1. The combination in a pump, of a base, a frame pivotally mounted on the base, a cylinder carried by the frame, a piston movable in the cylinder, a crank for reciprocating the piston, a pulley, means connecting the pulley and the crank, a plate pivotally connected with the base, a nut carried by said plate, a threaded spindle mounted on the pump frame and extending through said nut, and means for turning the spindle.

2. The combination in a pump, of a base, a frame pivotally mounted on the base, a cylinder carried by the frame, a piston movable in the cylinder, a crank for reciprocating the piston, a pulley, gears connecting the pulley and the crank, a plate pivotally connected with the base, a block carried by the plate, a threaded spindle carried by the pump frame and extending through the block, and means for turning the spindle.

3. The combination in a pump, of a base, a frame pivotally mounted on the base, a cylinder carried by the frame, a piston movable in the cylinder, means for reciprocating the piston, a plate pivotally connected with the base, a nut carried by said plate, a threaded spindle carried by the pump frame and extending through said nut, a head for turning the spindle, and a spring for normally holding the spindle from moving longitudinally with relation to the pump frame.

4. The combination in a pump, of a base adapted to be fixedly secured in position, a frame pivotally connected with the base, a cylinder carried by the frame, a piston movable in the cylinder, a crank for reciprocating the piston, a pulley carried by the frame, a train of reducing gears connecting the pulley and the crank, a plate pivotally connected with the base and adapted to be fastened to the base in any desired radial position, a nut carried by said plate, a threaded spindle extending through said nut and through parts of the pump frame, heads for turning the spindle, and springs for normally holding the spindle from moving longitudinally with relation to the pump frame.

5. The combination of a pump having a driving member, a supporting means for said pump, said driving member being movable with relation to said supporting means, and two independently operable means for adjusting the relative positions of said parts and holding the same therein.

6. The combination of a pump having a driving member, a supporting means for said pump, said driving member being movable with relation to said supporting means, and two independently operable means for adjusting the relative positions of said parts and holding the same therein, one of said means being adapted to effect wide variations and the other fine variations, in such adjustment.

7. The combination of a pump having a driving member, a supporting means for said pump, said driving member being movable with relation to said supporting means, and two independently operable means for adjusting the relative positions of said parts and holding the same therein, one of said means being adapted to effect wide variations, and the other fine variations, in such adjustment, and both of said means being carried wholly by said base.

8. The combination of a pump, a base upon which said pump is pivoted, means for adjusting the angle of said pump and base, and normally holding said parts in their adjusted positions, and a supplemental means for moving said pump toward and from its normally adjusted position.

9. The combination of a pump, a base upon which said pump is pivoted, means for adjusting the angle of said pump and base, and normally holding said parts in their adjusted positions, and a supplemental means for moving said pump toward and from its normally adjusted position, said pump and adjusting means being supported wholly by said base.

10. The combination of a pump, a base, a pivotal connection between the two, means for holding such parts in varying relative positions, a driving wheel for said pump, and supplemental means acting to move said wheel from its normally adjusted position independently of said means.

11. The combination of a pump, a base upon which said pump is pivoted, an adjusting means for altering the angular relation between said parts, a supplemental adjusting means including a member adapted to be moved relatively to one of said parts and to be fixed thereto in varying positions, and a second member carried by the other of said parts and adapted to act against said first member.

JOHN J. McINTYRE.

Witnesses:
JOSEPHINE M. STREMPFER,
HARRY R. WILLIAMS.